(12) United States Patent
Akporiaye et al.

(10) Patent No.: US 6,821,486 B1
(45) Date of Patent: Nov. 23, 2004

(54) MULTIAUTOCLAVE FOR COMBINATORIAL SYNTHESIS OF ZEOLITES AND OTHER MATERIALS

(75) Inventors: Duncan Akporiaye, Oslo (NO); Ivar Martin Dahl, Oslo (NO); Arne Karlsson, Oslo (NO); Rune Wendelbo, Oslo (NO)

(73) Assignee: Sinvent AS, Trondheim (NO)

( * ) Notice: Subject to any disclaimer, the term of this patent is extended or adjusted under 35 U.S.C. 154(b) by 0 days.

(21) Appl. No.: 09/308,562

(22) PCT Filed: Feb. 20, 1998

(86) PCT No.: PCT/NO98/00051

§ 371 (c)(1),
(2), (4) Date: Jul. 16, 1999

(87) PCT Pub. No.: WO98/36826

PCT Pub. Date: Aug. 27, 1998

(30) Foreign Application Priority Data

Feb. 20, 1997 (NO) .............................................. 970788

(51) Int. Cl.[7] .............................. B01L 3/00; B01L 1/00
(52) U.S. Cl. ......................... 422/102; 422/99; 422/104
(58) Field of Search ................................ 422/292, 294, 422/295, 296, 297, 300, 99, 104, 102

(56) References Cited

U.S. PATENT DOCUMENTS

| | | | | |
|---|---|---|---|---|
| 2,835,003 A | * | 5/1958 | Abrams | 422/296 |
| 3,130,007 A | | 4/1964 | Breck | 23/113 |
| 3,147,068 A | * | 9/1964 | Castle et al. | 422/296 |
| 3,627,477 A | * | 12/1971 | Beauvais | 422/296 |
| 3,681,008 A | * | 8/1972 | Black | 422/296 |
| 4,099,923 A | | 7/1978 | Milberger | 23/254 R |
| 4,493,815 A | * | 1/1985 | Fernwood et al. | 422/101 |

(List continued on next page.)

FOREIGN PATENT DOCUMENTS

| | | | |
|---|---|---|---|
| EP | 0 434 890 | 7/1991 | ............. B01J/3/04 |
| EP | 0 553 539 | 8/1993 | ............. C30B/7/00 |
| EP | 0 780 496 | 6/1997 | ............. C30B/7/00 |
| WO | 95/12608 | 5/1995 | ............. C07K/1/04 |
| WO | 96/11878 | 4/1996 | ............. C01G/5/04 |
| WO | 98/07026 | 2/1998 | |

OTHER PUBLICATIONS

A, van de Berg, et al. Molecular Concept for Miniature Chemical Systems, in: Dechema Monographs vol. 132, VCH Verlagsgesellschaft 1996, pp. 109–123.
Lexikon der Physik, 1998 Spekrum Akademischer Verlag Gmbh, Heidelberg, p. 213.

*Primary Examiner*—Terrence R. Tilt
*Assistant Examiner*—Laura C Cole
(74) *Attorney, Agent, or Firm*—Wenderoth, Lind & Ponack, L.L.P.

(57) ABSTRACT

The invention relates to a multi-autoclave and details of its design, a method for automated synthesis of zeolites in the multi-autoclave, and furthermore, to applications of the multi-autoclave for an automated synthesis which is optimized simultaneously with regard to several synthesis parameters in the synthesis of zeolites. The multi-autoclave consists typically of a pressure vessel/autoclave having from 10 to 10,000 small, separated chambers lined with an inert material, with each chamber typically having a volume of 0.2–2 ml. The chambers preferably are formed as through-going perforations in a central block and the perforations are sealed by balls, septa, stoppers or such which are placed at the bottom and top of each through-going perforation. Metal plates are placed over and under the central block so that a closing mechanism is pressed against the edges of the perforations with sufficient load to enable the chambers to be filled with aqueous mixtures and to be heated to 200° C. without the occurrence of leakage. Top and bottom plates and closing mechanisms can be integrated so that all the perforations are sealed simultaneously when these are placed at the top and bottom sides of the central block.

89 Claims, 8 Drawing Sheets

U.S. PATENT DOCUMENTS

| | | | | |
|---|---|---|---|---|
| 4,583,643 A | * | 4/1986 | Sanderson | 206/438 |
| 4,728,502 A | | 3/1988 | Hamill | 422/116 |
| 4,948,442 A | * | 8/1990 | Manns | 156/73.1 |
| 5,013,531 A | | 5/1991 | Snyder et al. | 422/245 |
| 5,019,345 A | * | 5/1991 | Lorenz | 422/296 |
| 5,039,493 A | | 8/1991 | Oprandy | 422/101 |
| 5,056,427 A | | 10/1991 | Sakabe et al. | 100/211 |
| 5,096,676 A | | 3/1992 | McPherson et al. | 422/245 |
| 5,112,574 A | | 5/1992 | Horton | 422/102 |
| 5,277,876 A | * | 1/1994 | Wagner | 422/296 |
| 5,282,543 A | | 2/1994 | Picozza et al. | 220/255 |
| 5,304,354 A | | 4/1994 | Finley et al. | 422/196 |
| 5,312,506 A | | 5/1994 | Omino | 117/83 |
| 5,322,591 A | | 6/1994 | Harris et al. | 117/71 |
| 5,324,483 A | | 6/1994 | Cody et al. | 422/131 |
| 5,342,581 A | | 8/1994 | Sanadi | 422/101 |
| 5,362,325 A | | 11/1994 | Shiraishi et al. | 117/201 |
| 5,400,741 A | | 3/1995 | DeTitta et al. | 117/206 |
| 5,424,047 A | * | 6/1995 | Zwingenberger et al. | 422/296 |
| 5,424,213 A | | 6/1995 | Mougin | 436/63 |
| 5,457,527 A | | 10/1995 | Manns et al. | 356/246 |
| 5,476,107 A | * | 12/1995 | Oakley et al. | 422/296 |
| 5,476,635 A | * | 12/1995 | Stoker | 422/26 |
| 5,505,916 A | | 4/1996 | Berry, Jr. | 422/300 |
| 5,531,185 A | | 7/1996 | Asano et al. | 117/206 |
| 5,580,523 A | | 12/1996 | Bard | 422/50 |
| 5,585,069 A | | 12/1996 | Zanzucchi et al. | 422/100 |
| 5,593,642 A | | 1/1997 | DeWitt et al. | 422/131 |
| 5,609,264 A | * | 3/1997 | Cerny et al. | 220/203.13 |
| 5,641,681 A | * | 6/1997 | Carter | 436/4 |
| 5,716,584 A | | 2/1998 | Baker et al. | 422/131 |
| 5,741,463 A | * | 4/1998 | Sanadi | 422/101 |
| 5,753,187 A | * | 5/1998 | Reynolds et al. | 422/102 |
| 5,961,926 A | | 10/1999 | Kolb et al. | 422/101 |
| 6,010,670 A | * | 1/2000 | Berry, Jr. | 422/295 |
| 6,649,413 B1 | | 11/2003 | Schultz et al. | |

* cited by examiner

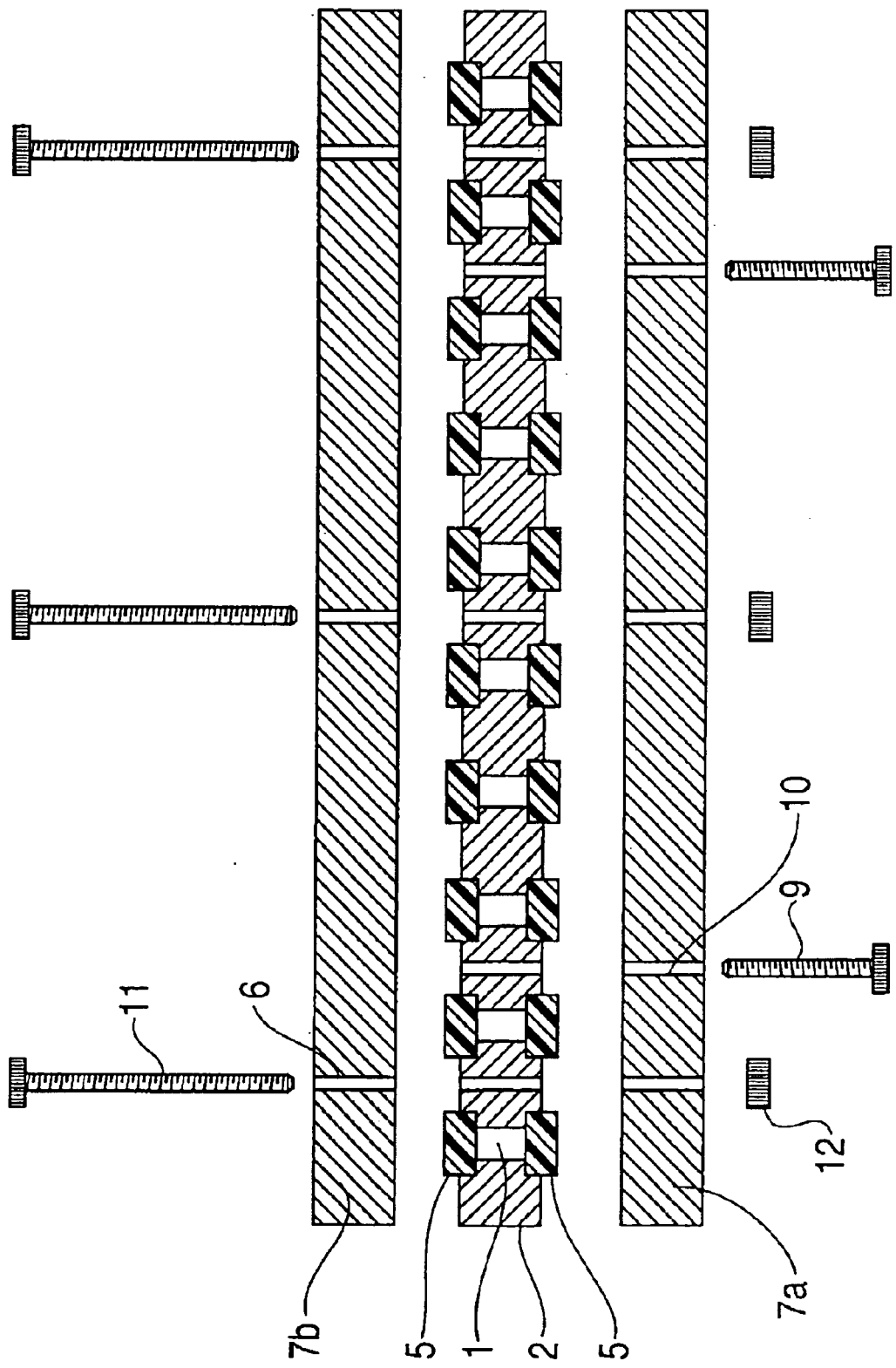

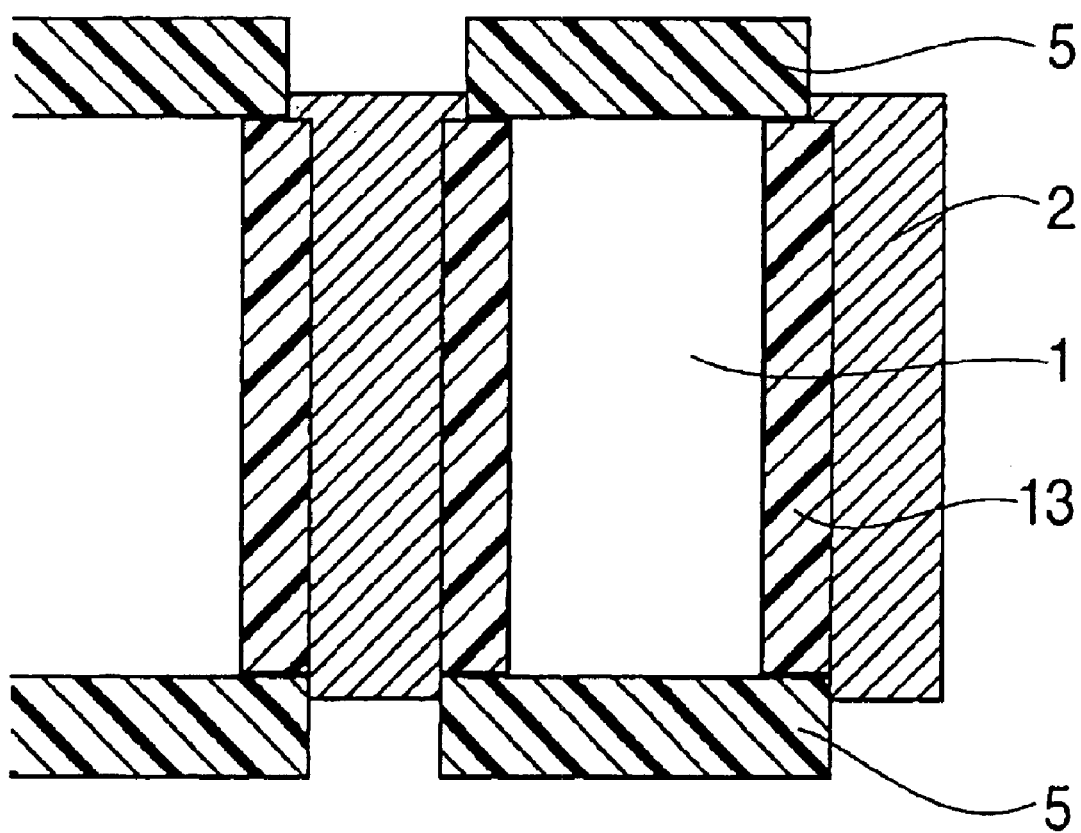

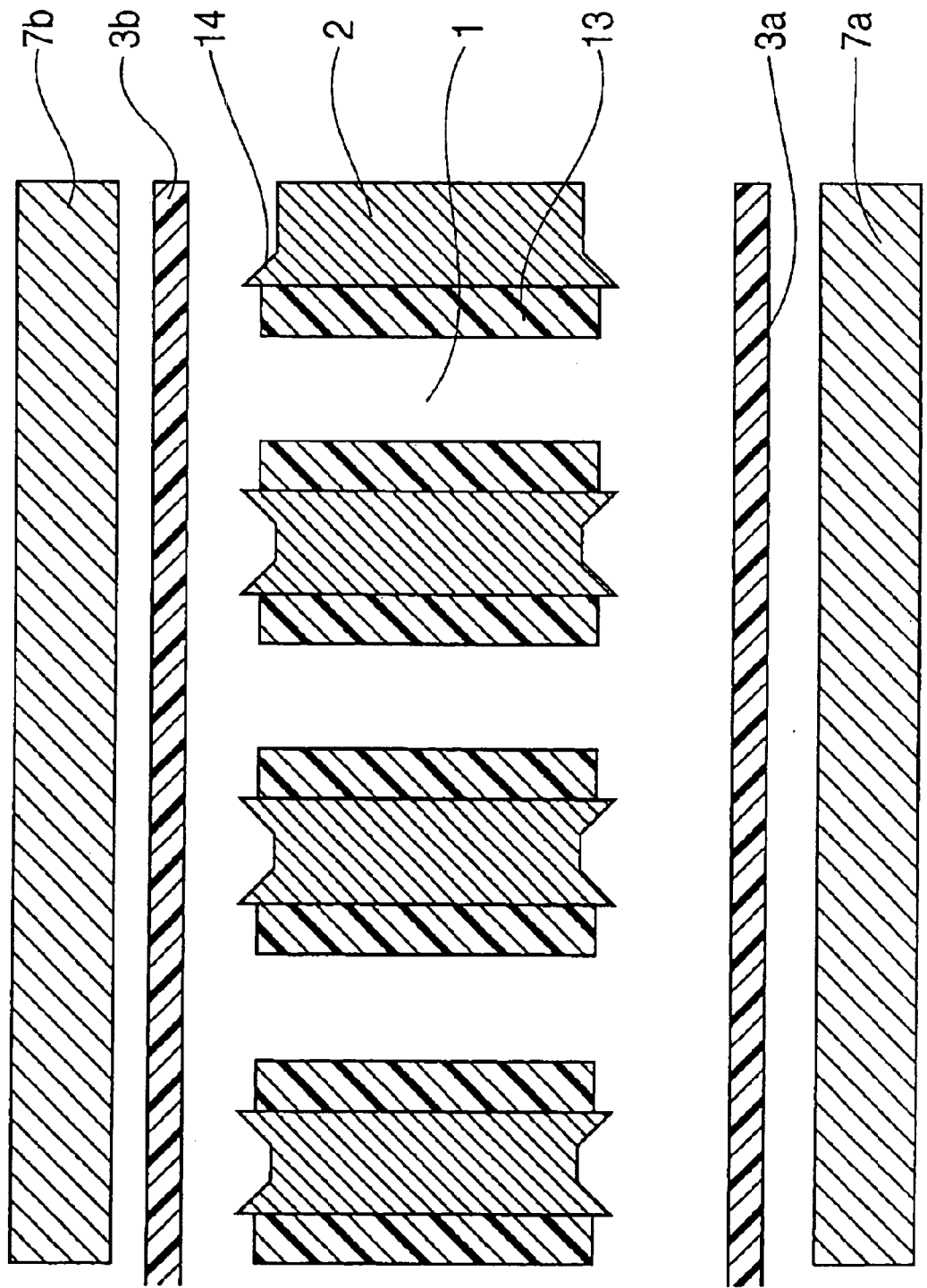

MULTIAUTOCLAVE FOR COMBINATORIAL SYNTHESIS OF ZEOLITES AND OTHER MATERIALS

FIELD OF THE INVENTION

The present invention relates to a pressure and temperature reactor vessel, especially a multi-autoclave and to details concerning the design of this equipment.

BACKGROUND OF THE INVENTION

Many materials, such as e.g. zeolites, are prepared by so-called hydrothermal synthesis at temperatures ranging from 100° C. to 200° C. requiring crystallization times of one hour or more. For syntheses being carried out at temperatures that are higher than the solvent's boiling point, it is necessary to use pressure vessels, and these have to be suitable for the temperature and pressure used during the operation. The pressure vessel has to be designed so that the handling of it does not represent any unnecessary hazard, provided it is used according to working instructions.

Zeolite syntheses are usually performed in strongly alkaline media, often at pH>14, and the reaction mixture will often contain toxic chemicals, such as e.g. fluoride. Conventionally, syntheses that may be performed at temperatures lower than 110° C. are carried out in polymer bottles, often Teflon, while reactions at higher temperatures require steel autoclaves, perhaps lined with Teflon. The price of an autoclave of this type with the required safety details are typically of the order of NOK 10,000 or higher. Furthermore, such an autoclave will weigh from 1 kilogram and upwards, and all these elements represent limitations regarding the number of syntheses that may be performed in most laboratories in the course of one year.

Zeolite synthesis is often carried out by keeping the synthesis mixture at around 100° C. for at least 6 hours. At these moderate temperatures sealed chambers are necessary in order to avoid drying out of the synthesis mixture.

As an example of conventional zeolite synthesis, Zeolite Y can be prepared according to U.S. Pat. No. 3,130,007, Example 1, by dissolving 5 g sodium aluminate containing 30 weight percent $Na_2O$ and 44 weight percent $Al_2O_3$ and 22 g sodium hydroxide containing 77.5 weight percent $Na_2O$ in 89.5 ml distilled water. This solution was added to 124.2 g of an aqueous colloidal silica solution with 29.5 weight percent $SiO2$, so that the resulting mixture had a composition corresponding to 13.9 $Na_2O$: $Al_2O_3$: 28.2 $SiO_2$:471 $H_2O$, and the mixture was homogenized by stirring. The mixture was enclosed in a sealed glass vessel, placed in a water bath and heated at 100° C. for 21 hours, after which the product was recovered by filtering, washed and dried. Common to all the synthesis procedures mentioned and for all other known synthesis procedures for preparation of zeolites on a laboratory scale with the purpose of discovering new zeolites or to optimize existing zeolites, is that these are performed in a cumbersome and expensive manner by having to separately prepare each reaction mixture, which typically consists of 4–7 reagents, and by adding the reagents one by one.

In many other examples the synthesis of zeolites and other molsieves need temperatures well above 100° C., so that steel pressure vessels or the like are required.

Furthermore, each reaction mixture is typically prepared in batches of 5 to 100 g and crystallized in expensive and heavy autoclaves with internal volumes often in the range of 25 to 250 ml and with weights of up to 8 kg per autoclave, causing considerable expense due to a large consumption of often expensive reagents and due to the fact that the handling of the heavy autoclaves often makes it impossible to handle more than one autoclave at the time, and finally that the size of the autoclaves limits the number of autoclaves that may be placed in each oven or heating unit The combination of all these elements are, according to known technology, making each zeolite synthesis a very resource intensive process, and there is a great need for greater efficiency, rationalization, downscaling and automation. Simple calculations have shown that by combining the different variables which are involved in zeolite synthesis with narrow enough intervals in reagent concentrations, temperatures, reaction time, etc. to cover any phase formation based on known examples, it is feasible to make up $10^{18}$ recipes. With today's synthesis capacity, which on a global basis hardly exceeds 100,000 syntheses per annum, it would take 10,000,000,000,000 years to carry out all these syntheses in which each and every one in theory has potential for the preparation of a new zeolite or other microporous material. The expenses involved in performing these syntheses according to known technology would obviously be formidable, and there is thus a great need for new and more cost efficient methods for zeolite synthesis.

In recent years new, automated methods for systematic preparation of new compounds, so-called "combinatorial techniques", have been developed, but equipment which may be used for liquid phase synthesis at temperatures above approximately 100° C. has til now not been disclosed, because this requires that the synthesis takes place in a hermetically sealed vessel at elevated pressures. WO 95/12608-A1 for instance, discloses an apparatus and a method for a) synthesis of several molecules on substrates, comprising distribution of the substrates in the reaction chambers, b) combination of the first addition of these molecules with different reagents in each of the reaction chambers, c) moving the substrates through tubing to separate mixing chambers where the substrates are mixed, d) redistribution of the substrates by transporting them through tubing back to the reaction chambers, and e) combination of a second portion of a different composition with the first portions of molecules in the different reaction chambers in order to prepare new mixtures. This publication describes only a system for mixing and distribution of different molecules and not a system for hermetical sealing of the reaction chambers which would make it possible to operate at high temperatures, and this system would thus not be suitable for the synthesis of zeolites. In WO 96/11878 there is a description of extensive use of a combinatorial arrangement for synthesis of new materials, including zeolite synthesis at 100° C. Even though this patent application presents a detailed description of instrumentation and equipment developed for different purposes, autoclave systems required for performing the syntheses under the prevailing physical conditions (elevated pressure and temperatures exceeding 100° C.) are not described.

The prior art teaches autoclaves with several chambers for special purposes, and there is for instance in U.S. Pat. No. 5,505,916 a description of a metal cassette which can be opened and closed like a suitcase, and which has an interior with compartments intended for placement of the different instruments used by dentists, where these may be sterilized by autoclaving. Furthermore, large autoclaves intended for instance for the growth of crystals, are known, and examples are described in U.S. Pat. No. 5,322,591, U.S. Pat. No. 5,312,506 and U.S. Pat. No. 5,476,635, but the purpose of these and similar autoclaves is to make it possible to carry out large-scale syntheses, for which there is a great need when a synthetic procedure has been established and scale-up is desired, or when the purpose is to grow single crystals as large as possible. The autoclave described in the earlier mentioned U.S. Pat. No. 5,312,506 is designed to withstand temperatures up to 1500° C. for growth of crystals from metal melts. Another feature in connection with work with autoclaves is energy savings, and this is addressed in EP 0.434.890 A1, with description of a system for insulation of the autoclave walls and for the design of such insulating layers in the walls, which could be useful for large-scale autoclaving, but is of no relevance when working with small laboratory autoclaves which are heated in ovens.

Furthermore, there is a series of known equipment intended for synthesis of proteins and biopolymers, where the design comprises sheets with a large number of chambers intended for screening of syntheses and crystal growth, and in its simplest form as described in U.S. Pat. No. 5,096,676 and U.S. Pat. No. 5,400,741 describes a diffusion cell for growth of the largest and the most perfect crystals possible of macromolecular compounds by a technique called the "hanging drop" technique. Several patents, e.g. U.S. Pat. No. 5,013,531, U.S. Pat. No. 5,531,185, U.S. Pat. No. 5,362,325 and EPA 0.553.539 A1, deal with cells for growth of proteins and biopolymer crystals in spacecrafts. Common for the latter patents is that the designs described are very sophisticated and thus very expensive, because they are intended for use in spacecrafts. Common for all equipment designed for synthesis and crystal growth of proteins and biopolymers is that they are meant for use at low temperatures, or typically temperatures in the range of 0° C. to 65° C., and that they consequently are not designed to withstand conditions typical for hydrothermal synthesis. In addition, many of these prior art synthesis cells are not lined with Teflon or other similarly inert materials, something that almost without exceptions is required for synthesis of zeolites and the like. There is, e.g., a known design called "multiblock" (Yrchnak, V., Vagner, J.; Peptide Res. 3, 182 (1990)) consisting of i) a Teflon block holding 42 reactors, polypropylene syringes equipped with polymer filters, ii) a vacuum adapter connecting each reactor to a vacuum line (not described in detail) which enables rapid washing in an apparatus for continuous flow, iii) two Teflon plates with 42 stoppers to which the Teflon block is fastened during use, and iv) a glass cover used during homogenization. The problem with this design is that the reactors which are made of glass and which do not have protected sidewalls may be used only at low pressures and not in strongly alkaline solutions. There is thus no available literature describing equipment that might be used for practical work with combinatorial zeolite synthesis, in as much as such syntheses almost without exception require hydrothermal treatment of a solution or gel with a relatively high content of water and often high contents of organic compounds in a closed chamber, and almost all methods for preparation of zeolites known so far require such conditions during synthesis. This is true without exception for all methods which have proved to be commercially applicable. The synthesis of zeolites is thus normally performed under hydrothermal conditions which require elevated pressures and high temperatures during periods up to several weeks without leakage. The problem has so far been the costs involved in this type of work, estimated to an average of NOK 5,000 per synthesis, including recovery of the product and XRD analysis. An important feature when dealing with large series of syntheses is therefore how the product can be recovered and washed in a rational way without insurmountable expense, something that is not disclosed in prior art. As far as is known, this type of work is performed in the same manner by all synthesis laboratories engaged in synthesis of zeolites and non-carbon-based molecular sieves.

SUMMARY OF THE INVENTION

One objective of the present invention has been to develop a complete system for screening of synthesis conditions for preparation of zeolites and other non-carbon materials requiring hydrothermal conditions in the temperature range 100° C. to 250° C. in a more cost efficient manner, and it has thus been of interest to improve a series of parameters, which means making them more cost efficient Some of these parameters are:

1. Reduced size of the separate reaction chambers and increased number of reaction chambers, which is called a multi-autoclave. This will lead to reduced use of reactants and thus cheaper synthesis.

2. Automated addition of reactants, for instance by having 100 reaction chambers present in one multi-autoclave and by enabling this to be connected to a pipetting machine which makes quick and exact addition of all liquid reactants possible.

3. Simple and easy-to-use mechanism for the closing and opening of the multi-autoclave.

4. Simple recovery and washing of the synthesis product and simple cleaning of the multi-autoclave after use.

5. Devices allowing automated analysis with X-ray diffraction and automatic identification of known crystalline phases by combination of an automatic sample switcher, a structure library stored in a database and software that can monitor sample switching and identification.

Another objective of the present invention described here has been to design automated equipment for larger synthesis series and prepare formulations based on mixtures of different liquids/solutions with varying reactant ratios.

These and other objectives are attained by the present invention, which represents a break-through in terms of cost reduction for zeolite synthesis in that the reaction mixture crystallizes in a volume reduced typically to $\frac{1}{100}$ of what has been used conventionally, thereby achieving reduced consumption of reactants and cheaper syntheses, and further by enabling automated addition of reactants, e.g. by having 100 or more available reaction chambers in one single multi-autoclave. The multi-autoclave plates can be connected to a pipetting machine that makes quick and exact addition of all liquid reactants possible, and several such plates with reaction chambers can be placed on top of each other without difficulty. Furthermore, an important feature of the present invention is the simple and not very time-consuming operation of the multi-autoclave.

The present invention relates to a pressure and temperature reactor vessel i.e. a multi-autoclave, comprising a) a central block having a multitude of perforations, wherein the perforations are through-going perforations, cavities or another form of hole permanently closed at one end, b) a cover member, operatively associated with a sealing member, for engagement with the central block to seal the open ends of the perforations to form a multitude of chambers, c) a sealing member, operatively associated with the cover member to form a pressure tight seal when the cover member is brought into position by a locking device, and d) a locking device acting in concert with the cover member to engage the sealing member so as to define a multitude of reaction chambers.

Applications for the present invention may, in addition to zeolite synthesis, be in any field of activities within research and development connected to products where at least one production step comprises the mixing of different liquids, e.g. in the fields of organic and inorganic syntheses, paint production, formulation of fuels, food industry, etc., and, furthermore, applications can include clinical testing or dissolution and digestion of samples with acid etc., where a liquid reactant is added to a liquid or solid. The invention is in particular aimed at applications where open vessels cannot be used, and more specifically for applications where it is required to operate at temperatures which will cause elevated pressures in the liquid part of the mixture.

BRIEF DESCRIPTION OF THE DRAWINGS

FIG. 3 is a side view of an alternative design of the multi-autoclave;

FIG. 4 is a side-sectional view of one chamber of the multi-autoclave equipped with a Teflon liner and disk-shaped lids;

FIG. 5a is an exploded view of a section of the multi-autoclave:

Figure 5B:
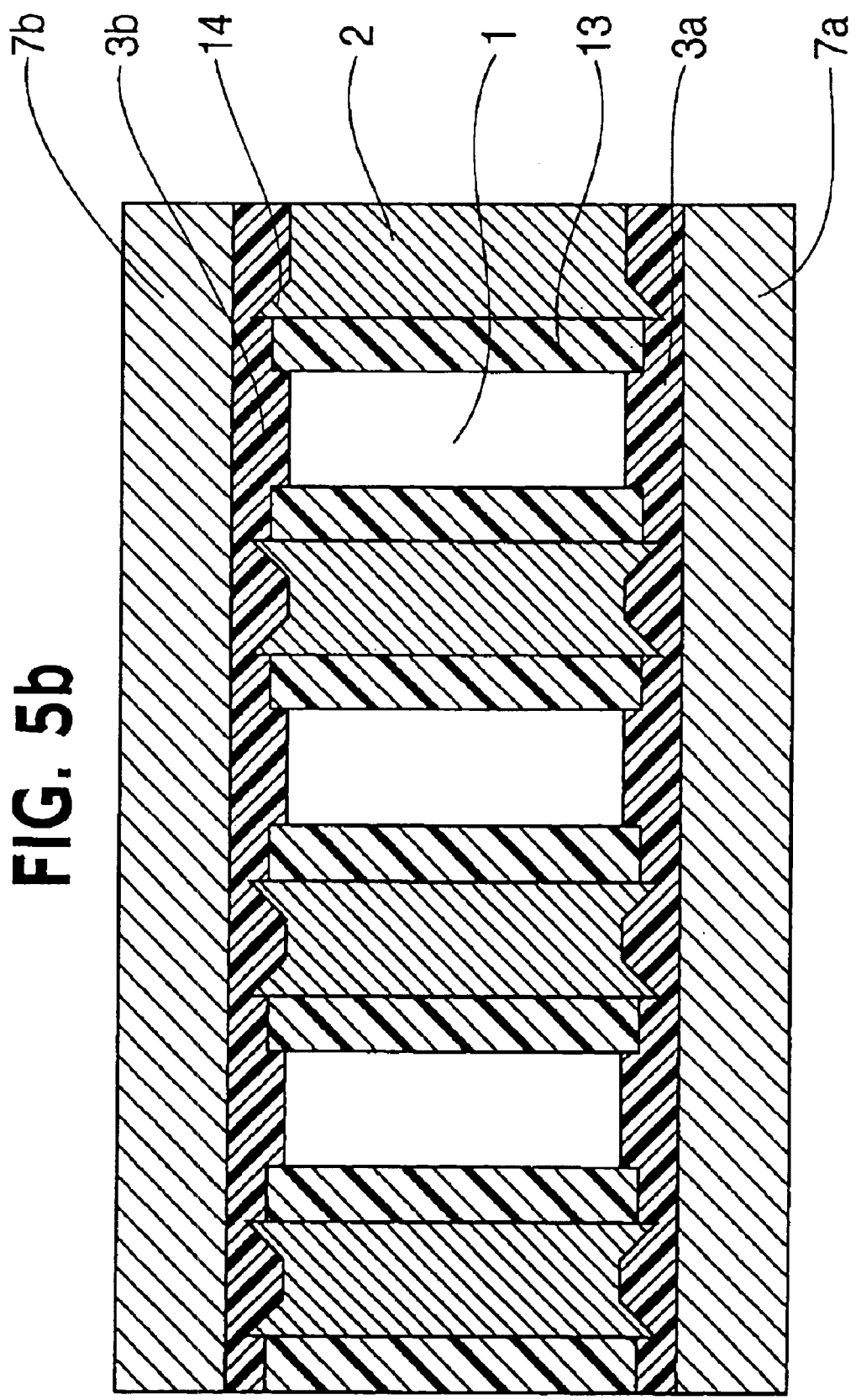
FIG. 5b shows the multi-autoclave in a closed state.

The invention comprises a unit containing a multitude of pressure vessels, also referred to as a multi-autoclave. This multi-autoclave has typically from 10 to 10,000 or more small, separate chambers (1), each typically with a volume of 0.001–10 ml. The multi-autoclave is composed of a set of plates (2 and 7a, 7b) and optionally thin laminae (3a, 3b) which are stacked so that they form a matrix of small chambers (1), as shown in FIGS. 1-5b. The thickness of the different plates and laminae may vary, always keeping in mind that a maximum number of small chambers with optimal size is desired, and that the chambers must be leak tight and dimensioned such that no excessive degree of deformation will take place under the operational conditions which the equipment is designed for. The central block consisting of a perforated plate (2) with a multitude of perforations serve, when sandwiched between the plates (7a and 7b), as the frame of the pressure chambers, and may for use at higher temperatures (150–250° C.) be made from stainless steel, aluminum, titanium or other rigid material such as PEEK or the like. The perforations have 10 mm diameters, wherein each perforation is lined with a segment of Teflon tubing or tubing made from another suitable polymer material having a wall thickness of 1–3 mm. For use at temperatures below 150° C., the central block can be made entirely of Teflon, for use below 130° C. it can be made of polypropylene, and for use below 105° C. it can be made of polyethylene. In the separate pressure chambers, balls (4) made from Teflon or other suitable material such as steel, PEEK, nylon or glass may be used as a bottom and top lid, also referred to as sealing means or septa (5). Alternatively, circular disks made from an elastomer or from another appropriate material such as Teflon, which will provide an advantage in the form of reduced weight and volume, may be used as the top and bottom lids. The septa (5) should be made from an elastomer, preferably Viton, or other suitable material that can withstand temperatures of at least 200° C., and they may be equipped with Teflon lining (13) on the side facing the chamber as shown in FIGS. 4 and 5. Furthermore, the septa (5) should have a thickness considerably larger than the depth of immersion, as shown on FIG. 3, in order to ensure a tight fit when assembling the different elements. As an alternative, the septa or balls may be fastened on the bottom and top plates, or on separate polymer films or a thin metal plate, in such a way that they may be put in place and removed in a simple manner. The bottom and top plates (7a, 7b) thus hold balls, septa, stoppers or other types of suitable cover means in place as the central block (2) is squeezed between the bottom and top plates. In order to avoid the use of balls, septa, stoppers or loose parts, the bottom and top plates can also be designed with a structure that has conical or hemispheric protrusions that fit into the perforations. Another design comprises polymer films molded or otherwise shaped to cover all the perforations. In yet another design, the central block has been machined so that sharp edges (14) protrude around each perforation or well, as shown in FIGS. 5a and 5b. The advantage of this design is that one smooth polymer sheet can be used as a lid or sealing device for all the chambers because the sharp protrusions cut into this polymer sheet so that leakage between adjacent chambers does not occur when the reaction vessel is closed with its locking mechanism. The sharp protrusions (14) could alternatively consist of rings or a rectangular grid that are either welded onto the central block (2) or fastened by any other suitable method. These protrusions may optionally be part of the insides of the top and bottom plates (7a, 7b) or the central block (2). The important point here is that the load used when assembling the different elements is concentrated just at the edges of the perforations and lids, so that liquid or vapor cannot leak out during heating.

Figure 7:
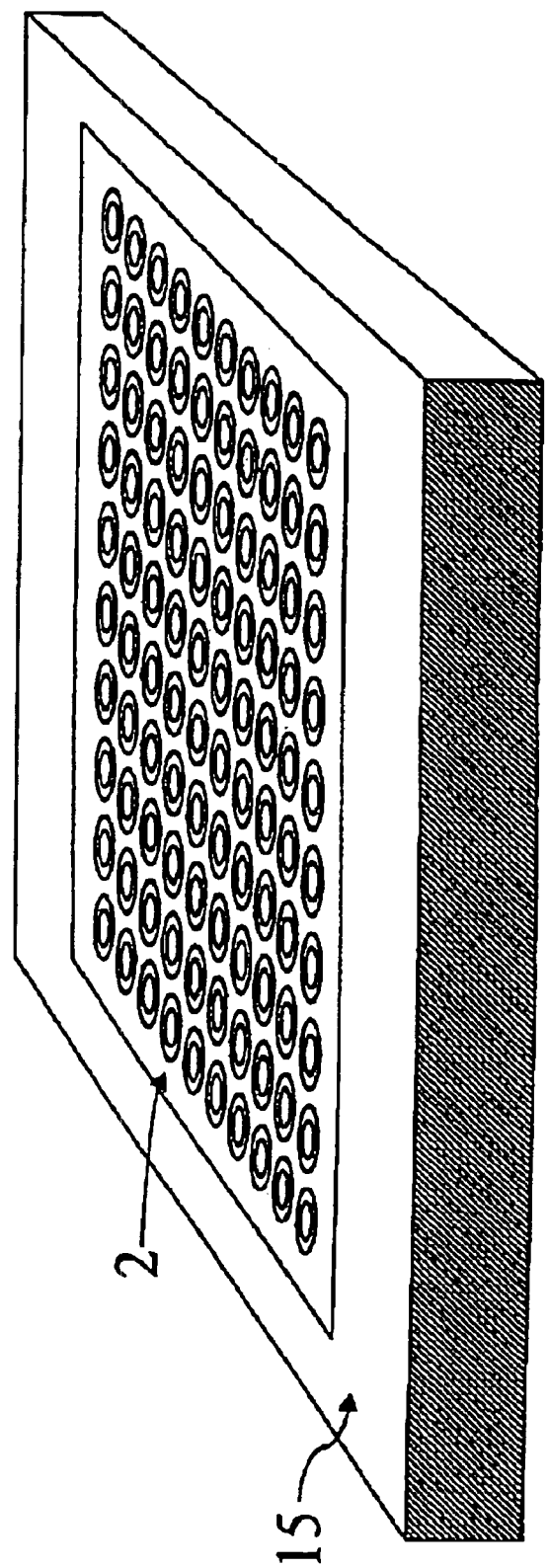
FIG. 7 shows a frame of the multi-autoclave.

In one embodiment, all plates and laminae have a series of holes (6) drilled therethrough for receiving locking means, which can be bolts which are used to assemble the multi-autoclave and ensure a sufficient counter-pressure to prevent leakage when the liquid in the chambers is heated to high temperatures. The bolts are placed in such a manner and their number is adjusted so that a sufficiently distributed even load is obtained in order to ensure that all the chambers are tightly closed when in use. The multi-autoclave may alternatively be closed by pressing the plates against each other employing a clamping or squeezing mechanism that makes through-going bolts unnecessary. The squeezing mechanism may include springs or the like, which ensure the maintenance of a suitable pressure. As shown in FIG. 7. a frame 15 made of a rigid material that ensures good tightness in the outer chambers may enclose the entire multi-autoclave, also counteracting deformation of plates made of pure Teflon or another ductile material. Bolts and frames or whatever other locking mechanisms used are tightened with a torque wrench in order to ensure correct load throughout A possible feature of the design is that a large number of plates may be placed on top of each other forming layers of reaction chambers according to the desired capacity. As an example, 10 plates with pressure chambers can be placed on top of each other without requiring a total my multi-autoclave thickness of more than typically 25–40 cm. Another important feature of this invention is that the large number of chambers, which are created by the described assembly of the various described parts, subsequent to performing a number of syntheses can be opened at both ends. This makes simple and efficient recovery and washing of the synthesis products possible. As an example of how this can be performed, the top plate with associated lid (e.g. septum) is removed first, and a filter paper is placed over the chambers and pressed against the central block (2) with a sponge or another suitable absorbent, or a filter supported by a rigid grid connected to a pump is placed over the chambers. The multi-autoclave is then turned upside-down, and the bottom plate with its associated lid is removed. The liquid in the reaction chambers can then drain through the filter, and the synthesis product can be washed by flushing down through the perforations. As a result, the final, washed synthesis products are each in its own position on the filter paper, and these positions correspond to the positions of the perforations of the central block (2) in the multi-autoclave, so that identification of the synthesis products can be achieved. The samples are placed in a well-defined matrix that, in principle, in a simple manner can be transferred to an automatic sample-switching unit for analysis by X-ray diffraction. It is often desirable to calcine inorganic samples after synthesis, and for this purpose the samples can be washed from the multi-autoclave and into the perforations of another block which is made of a material suitable for performing calcination, such as stainless steel or quartz.

Whenever the perforations, which on closing form the pressure chambers, extend through the central block, the bottom has to be closed before charging the chambers with liquid or other reactants. This can be achieved in a simple manner by placing the perforated plate (2) on top of a plate (7a) provided with balls, septa or other sealing devices between the perforated plate and the top plate. The two plates (2 and 7a) are then bolted together with a set of bolts (9) with lengths somewhat less than the combined thickness of the two plates, so that no part of the bolts is protruding from the plate assembly. In the example shown in FIG. 2, six bolts placed as illustrated have been found to be sufficient to hold the bottom plate sufficiently tight to the central block After the chambers have been charged, the top plate (7b) with its sealing devices is put in place, and another set of bolts (11), which are considerably longer than the thickness of the entire multiautoclave, is put through a separate set of through-going holes (6) and tightened with nuts (12) at the bottom side with a torque wrench and with a load sufficient to keep the multi-autoclave tight under the prevailing synthesis conditions it is going to be exposed to. Springs adjusted to a suitable pressure can, for instance, be put on the bolts before placing the nuts on them.

The advantages of the present invention are primarily related to the large rationalization gain that gives a correspondingly large economic savings. The savings are estimated to be from 90 to 99%. In other words, either the cost related to a given synthesis program is reduced by 90–99%, or it is possible for a given amount of money to perform 10–100 times as many syntheses. Such an automated layout will make it possible to perform 1000 syntheses/formulations simultaneously, and it will thus be very useful for all research laboratories, in industry as well as in research institutions/universities.

Multi-autoclaves suited for the purposes mentioned above might be designed as described in the following examples, but the descriptions are to be considered merely as examples of possible designs and the given measurements and other details shall not be considered to be limitations to the invention.

EXAMPLE 1

Figure 1:
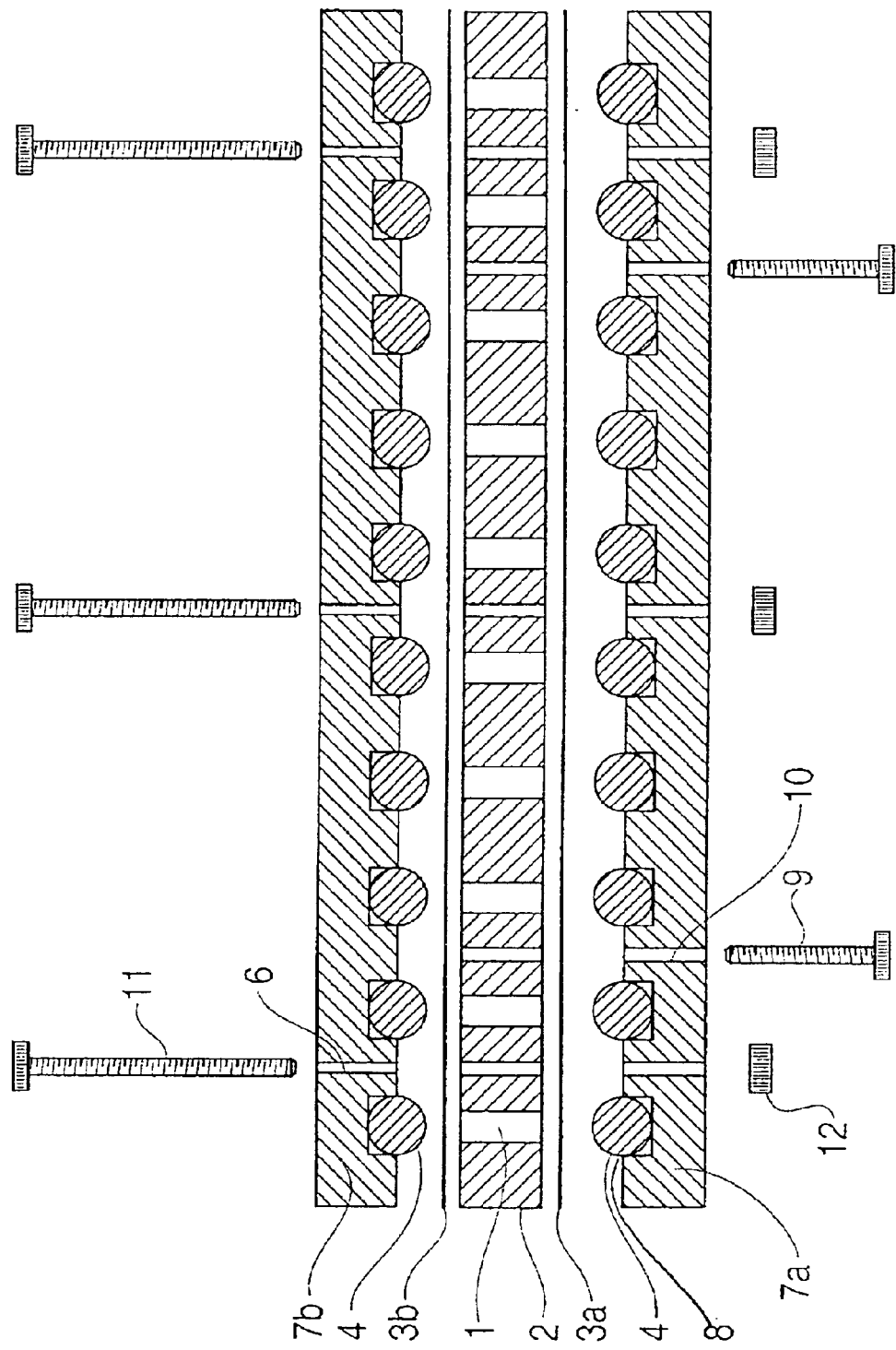
FIG. 1 is a side view of a multi-autoclave with components thereof disassembled.
Figure 2:
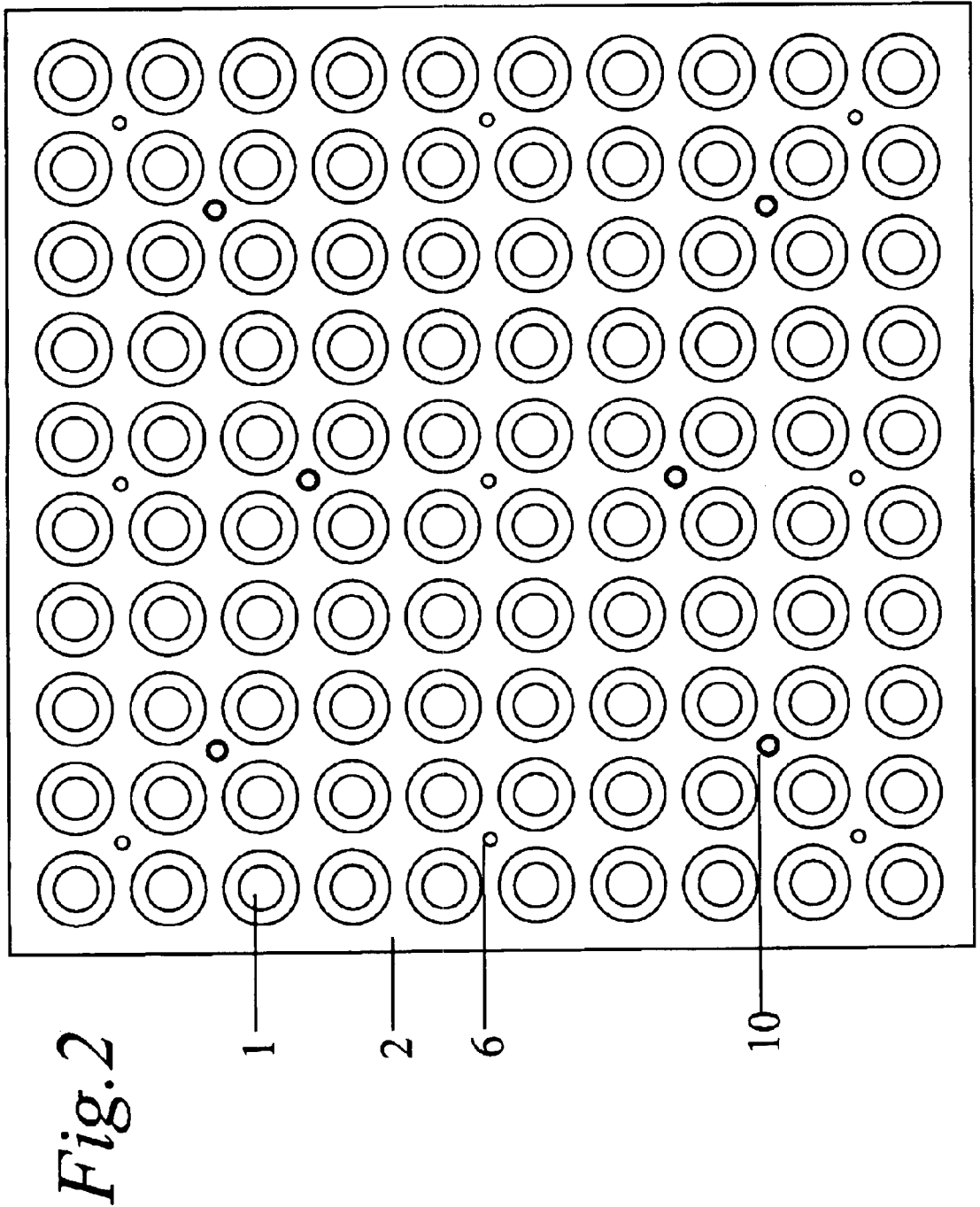
FIG. 2 is a top view of the multi-autoclave.

A multi-autoclave is built from 5 layers as shown in FIG. 1. The different layers are placed on top of each other and bolted together so that 100 hermetically sealed chambers (1) are formed. By stacking several layers in a suitable way, it is possible to make a multi-autoclave with 1000 chambers or more. A decisive element in the invention described here is the combination of steel balls (4) and a thin polymer film (3a, 3b) for the closing of the small chambers in the multi-autoclave. In as much as the contact between the edge of each perforation and a corresponding steel ball is exposed to the total pressure developed by tightening the bolts, the multi-autoclave will be tightly sealed aided by slight deformation of the ductile parts.

The multi-autoclave is from bottom to top built of the following elements as shown in FIG. 1. Provided is a bottom plate (7a) made from aluminum or steel, with 100 symmetrically positioned cavities (8), each with a diameter of 13 mm. Each cavity has a depth of 8 mm, and stainless steel balls (4) with diameters of 13 mm are placed in each cavity. In addition, the plate has 9 smaller, through-going holes (6) for bolts that are used to keep all the plates bolted together. Also provided is a thin polymer film (3a) made of Teflon, and the purpose of this film is to tightly press against the perforations in the perforated plate (2) and to avoid direct contact between the steel balls (4) and the synthesis mixtures. The polymer film has 9 smaller holes (6) extending therethrough for receiving bolts used to keep all the plates together. Also provided is a 2 cm thick Teflon plate (2) with 100 symmetrically positioned perforations having a diameter of 8 mm. In addition, this plate has 9 smaller holes (6) extending therethrough for receiving bolts used to keep all the plates together. There is also another set of holes (10) extending through the bottom plate (7a) and the perforated plate (2) that is used to keep these two plates with the corresponding balls tightly held together while adding liquid into the perforations. Also provided is another thin polymer film (3b) made from 0.5 mm Teflon, and the purpose and design of this film is the same as that for (3a). A top plate (7b) is placed above the film (3b), and is identical to the bottom plate (7a), but inverted in relation thereto.

As shown in FIG. 7, a frame 15 ensuring good sealing of the outer chambers by preventing lateral deformation of the Teflon block (2) is fastened around

EXAMPLE 2

In another embodiment, a multi-autoclave was designed and built as shown in FIG. 3. In this case, Teflon-lined septa (5) of the type "MICROSEP F138" from Alltech, which are stable up to 250° C., were used as bottom and top lids for each of the small chambers.

The multi-autoclave was constructed from the following elements according to FIG. 3. Provided is a bottom aluminum plate (7a) that is 2 cm thick and has 9 smaller, through-going holes for receiving bolts (11) used for holding all the plates bolted together. Mounted above this plate is a 2 cm thick Teflon plate with 100 symmetrically positioned perforations having diameters of 8 mm. Further, above and below each perforation there is a 1 mm deep recess having a diameter of 13 mm where Teflon-lined septa (5) having a thickness of 2 mm are placed. This plate also has 9 smaller, through-going holes for receiving bolts used to keep all the plates bolted together. There is also a set of 6 holes (10) with associated bolts (9) used to hold the bottom plate (7a) and the central block (2) together.

An upper aluminum plate (7b), 2 cm thick, is placed on top of the central block (2). This plate also has 9 smaller, through-going holes for receiving bolts (11) used to keep all the plates bolted together.

In order to test the designed multi-autoclave, the bottom plate (7a) and the central block (2) (FIG. 3) were bolted together so that a plate with 100 wells having a solid bottom resulting from embedding the septa (5) was formed. The resulting wells were each filled with 0.5 ml water, and a top plate with the associated septa was fastened to the central block (2) by bolts. The multi-autoclave was then placed in a heating cabinet at 150° C. for three days. When the multi-autoclave was opened after three days, the liquid levels in the 100 chambers were unchanged.

EXAMPLE 3

In yet another embodiment, a heavy duty multi-autoclave was designed and built essentially as shown in FIG. 3, but in this case provided was a 20 mm thick central block (2) made of 316-stainless steel having wells of a diameter of 13.75 mm and a depth of 19 mm. The remaining 1 mm of the plate was drilled through with a tool having a diameter of 12.45 mm resulting in a design, essentially, as displayed in FIG. 4. The 13.75 mm perforations were lined with Teflon cylinders (13) having a 2.75 mm wall thickness and an 18 mm length so that above and below each cylinder there is a 1 mm deep recess with a diameter of 13.75 mm at one end and of 12.45 mm at the other end. 3 mm thick Teflon disks (5) having 13.75 mm and 12.45 mm diameters, respectively, were used as bottom and top lids for each of the small chambers.

EXAMPLE 4

The bottom plate (7a) and the central block (2) of the multi-autoclave described in Example 2 with septa (5) embedded were bolted together so that a plate with 100 wells having a solid bottom was formed. This plate was then connected to an automatic pipetting machine of the "Tecan miniprep™" type which was programmed to dispense the desired amounts of four different solutions to each of the 100 wells, so that a total of 100 reaction mixtures with different compositions was prepared in about 30 min.

EXAMPLE 5

Figure 6:
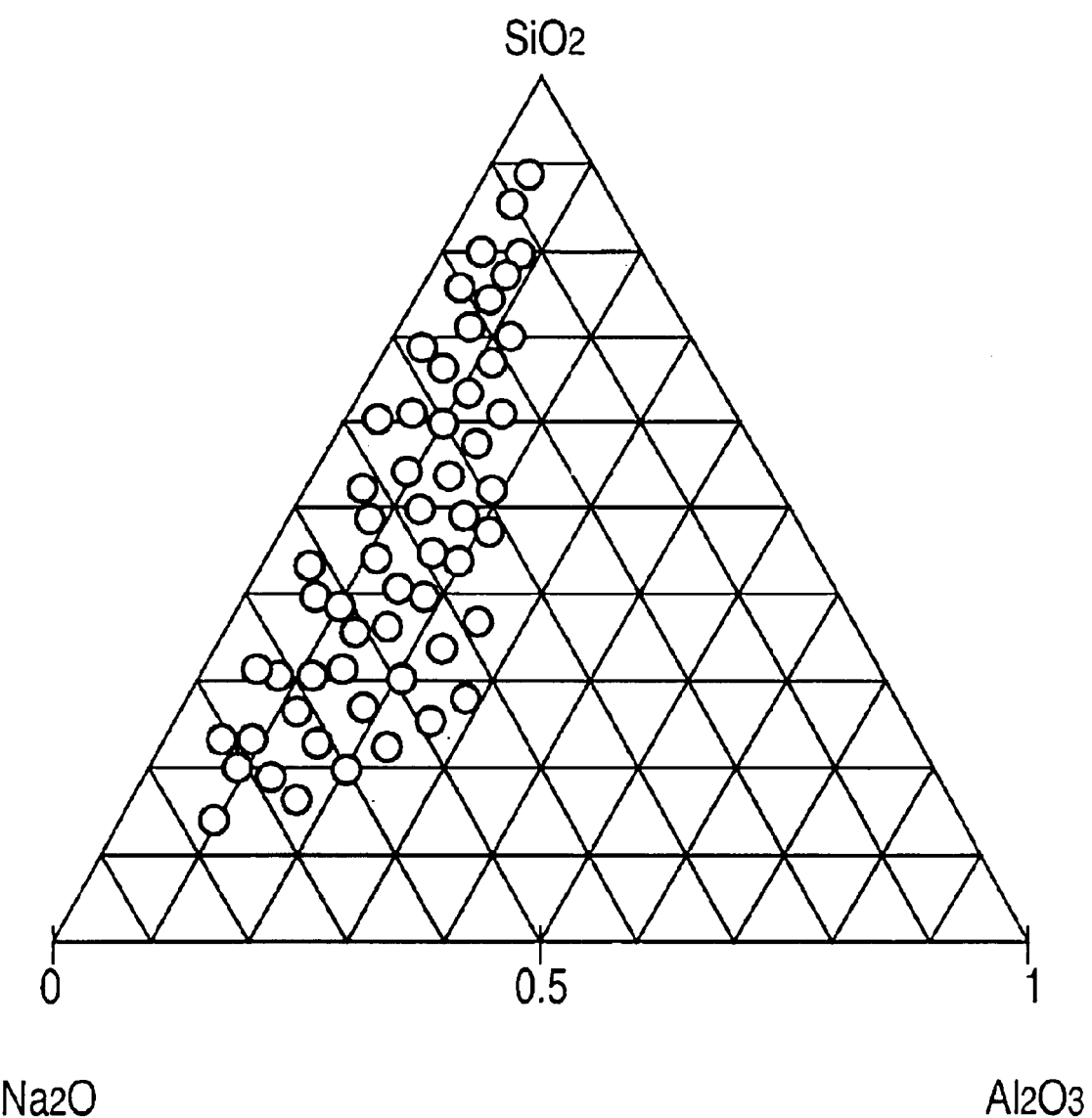
FIG. 6 shows an example of different chemical compositions covered in one single experiment using the multi-autoclave.

A multi-autoclave as described in Example 1 was used for 64 zeolite syntheses based on 56 different gel compositions derived from four different solutions, including water, so that it covered the composition range for the Na—Si—Al system shown in FIG. 6. The matrix had sixty-four points, but eight of these were excluded because they appeared outside the desired range. The eight spare chambers were instead used for reproductions, so that the total number of different compositions were fifty-six, and these fifty-six compositions are given as molecular ratios in Table 1 and as volume units in Table 2, and the last five columns in Table 2 are volume units adjusted so that each small synthesis chamber will contain an exact volume of 0.5 ml synthesis mixture.

The four solutions were prepared so that all Si is dissolved in solution no. 4 and all Al is dissolved in solution no. 1. Solution no.1 also contains an amount of NaOH sufficient to keep Al dissolved as well as water as solvent Solution no. 3 was used to makeup the NaOH concentration (corrected for Na content in solutions no. 1 and no. 4), and finally, water was used to make up the amount of water required for the recipe. All solutions were normalized to 500 $\mu$l. The compositions of the four solutions were:

1. 100 g $NaAlO_2$+8.5 g NaOH+391.5 g water
2. 21.8 g NaOH+100 g water
3. Water
4. Ludox LS-30 which is 30% silica solution in water The solutions were prepared in the order and amounts given in Table 1, and automatic pipettes were used for charging the multi-autoclave chambers with the solutions. Four gel compositions were chosen as reproductions, and three parallels of these were made in the multi-autoclave and, in addition, a larger scale (approx. 40 g gel) synthesis was performed in a separate plastic flask as a control of the possible effects of down- or up scaling. The four reproductions were chosen so that they represented points in the range of the four zeolitic phases FAU, CHA, GML and LTA given in FIG. 4.5.c on page 70 in "Zeolite Molecular Sieves, Structure Chemistry and Use" by D. W. Breck, 1974, Wiley and Sons, New York The multi-autoclave was placed in a heating cabinet after being kept over-night at room temperature. It was opened after 93 hours of crystallization at 100° C., and it was established that all sixty-four chambers remained sealed without leakage, and a large filter paper was placed so that it covered the sixty-four perforations and a moisture absorbing material was pressed against the outside of the filter paper so that remaining moisture was separated from the crystalline products. The products were washed by adding a small aliquot of water (0.5 ml) to each perforation for washing. Thereafter, when the solid material was transferred to the filter paper, the perforated Teflon plate was removed and the sixty-four filter "cakes" were transferred to sixty-four separate glass sample vials. The samples were then dried at 100° C. in a drying cabinet.

TABLE 1

| $SiO_2$/$Al_2O_3$ | $Na_2O$/$Al_2O_3$ | $SiO_2$/$Na_2O$ | sum | $SiO_2$ | $Na_2O$ | $Al_2O_3$ | $H_2O$ |
|---|---|---|---|---|---|---|---|
| 1.0 | 1.5 | 0.654 | 3.53 | 0.283 | 0.433 | 0.283 | 19.0 |
| 1.0 | 1.9 | 0.526 | 3.90 | 0.256 | 0.487 | 0.256 | 19.0 |
| 1.0 | 2.4 | 0.417 | 4.40 | 0.227 | 0.545 | 0.227 | 19.0 |
| 1.0 | 3.0 | 0.333 | 5.00 | 0.200 | 0.600 | 0.200 | 19.0 |
| 1.0 | 4.0 | 0.250 | 6.00 | 0.167 | 0.667 | 0.167 | 19.0 |
| 1.5 | 1.5 | 0.980 | 4.03 | 0.372 | 0.380 | 0.248 | 19.0 |
| 1.5 | 1.9 | 0.789 | 4.40 | 0.341 | 0.432 | 0.227 | 19.0 |
| 1.5 | 2.4 | 0.625 | 4.90 | 0.306 | 0.490 | 0.204 | 19.0 |
| 1.5 | 3.0 | 0.500 | 5.50 | 0.273 | 0.545 | 0.182 | 19.0 |
| 1.5 | 4.0 | 0.375 | 6.50 | 0.231 | 0.615 | 0.154 | 19.0 |
| 1.5 | 5.3 | 0.283 | 7.80 | 0.192 | 0.679 | 0.128 | 19.0 |
| 1.5 | 8.0 | 0.188 | 10.50 | 0.143 | 0.762 | 0.095 | 19.0 |
| 2.3 | 1.5 | 1.503 | 4.83 | 0.476 | 0.317 | 0.207 | 19.0 |
| 2.3 | 1.9 | 1.211 | 5.20 | 0.442 | 0.365 | 0.192 | 19.0 |
| 2.3 | 2.4 | 0.958 | 5.70 | 0.404 | 0.421 | 0.175 | 19.0 |
| 2.3 | 3.0 | 0.767 | 6.30 | 0.365 | 0.476 | 0.159 | 19.0 |
| 2.3 | 4.0 | 0.575 | 7.30 | 0.315 | 0.548 | 0.137 | 19.0 |
| 2.3 | 5.3 | 0.434 | 8.60 | 0.267 | 0.616 | 0.116 | 19.0 |
| 2.3 | 8.0 | 0.288 | 11.30 | 0.204 | 0.708 | 0.088 | 19.0 |
| 2.8 | 1.5 | 1.830 | 5.33 | 0.525 | 0.287 | 0.188 | 19.0 |
| 2.8 | 1.9 | 1.474 | 5.70 | 0.491 | 0.333 | 0.175 | 19.0 |
| 2.8 | 2.4 | 1.167 | 6.20 | 0.452 | 0.387 | 0.161 | 19.0 |
| 2.8 | 3.0 | 0.933 | 6.80 | 0.412 | 0.441 | 0.147 | 19.0 |
| 2.8 | 4.0 | 0.700 | 7.80 | 0.359 | 0.513 | 0.128 | 19.0 |
| 2.8 | 5.3 | 0.528 | 9.10 | 0.308 | 0.582 | 0.110 | 19.0 |
| 2.8 | 8.0 | 0.350 | 11.80 | 0.237 | 0.678 | 0.085 | 19.0 |
| 4.0 | 1.5 | 2.614 | 6.53 | 0.613 | 0.234 | 0.153 | 19.0 |
| 4.0 | 1.9 | 2.105 | 6.90 | 0.580 | 0.275 | 0.145 | 19.0 |
| 4.0 | 2.4 | 1.667 | 7.40 | 0.541 | 0.324 | 0.135 | 19.0 |
| 4.0 | 3.0 | 1.333 | 8.00 | 0.500 | 0.375 | 0.125 | 19.0 |

TABLE 1-continued

| SiO2/Al2O3 | Na2O/Al2O3 | SiO2/Na2O | sum | SiO2 | Na2O | Al2O3 | H2O |
|---|---|---|---|---|---|---|---|
| 4.0 | 4.0 | 1.000 | 9.00 | 0.444 | 0.444 | 0.111 | 19.0 |
| 4.0 | 5.3 | 0.755 | 10.30 | 0.388 | 0.515 | 0.097 | 19.0 |
| 4.0 | 8.0 | 0.500 | 13.00 | 0.308 | 0.615 | 0.077 | 19.0 |
| 4.0 | 12.0 | 0.333 | 17.00 | 0.235 | 0.706 | 0.059 | 19.0 |
| 6.0 | 1.5 | 3.922 | 8.53 | 0.703 | 0.179 | 0.117 | 19.0 |
| 6.0 | 1.9 | 3.158 | 8.90 | 0.674 | 0.213 | 0.112 | 19.0 |
| 6.0 | 2.4 | 2.500 | 9.40 | 0.638 | 0.255 | 0.106 | 19.0 |
| 6.0 | 3.0 | 2.000 | 10.00 | 0.600 | 0.300 | 0.100 | 19.0 |
| 6.0 | 4.0 | 1.500 | 11.00 | 0.545 | 0.364 | 0.091 | 19.0 |
| 6.0 | 5.3 | 1.132 | 12.30 | 0.488 | 0.431 | 0.081 | 19.0 |
| 6.0 | 8.0 | 0.750 | 15.00 | 0.400 | 0.533 | 0.067 | 19.0 |
| 6.0 | 12.0 | 0.500 | 19.00 | 0.316 | 0.632 | 0.053 | 19.0 |
| 10.0 | 1.5 | 6.536 | 12.53 | 0.798 | 0.122 | 0.080 | 19.0 |
| 10.0 | 1.9 | 5.263 | 12.90 | 0.775 | 0.147 | 0.078 | 19.0 |
| 10.0 | 2.4 | 4.167 | 13.40 | 0.746 | 0.179 | 0.075 | 19.0 |
| 10.0 | 3.0 | 3.333 | 14.00 | 0.714 | 0.214 | 0.071 | 19.0 |
| 10.0 | 4.0 | 2.500 | 15.00 | 0.667 | 0.267 | 0.067 | 19.0 |
| 10.0 | 5.3 | 1.887 | 16.30 | 0.613 | 0.325 | 0.061 | 19.0 |
| 10.0 | 8.0 | 1.250 | 19.00 | 0.526 | 0.421 | 0.053 | 19.0 |
| 10.0 | 12.0 | 0.833 | 23.00 | 0.435 | 0.522 | 0.043 | 19.0 |
| 20.0 | 1.5 | 13.072 | 22.53 | 0.888 | 0.068 | 0.044 | 19.0 |
| 20.0 | 2.4 | 8.333 | 23.40 | 0.855 | 0.103 | 0.043 | 19.0 |
| 20.0 | 4.0 | 5.000 | 25.00 | 0.800 | 0.160 | 0.040 | 19.0 |
| 20.0 | 5.3 | 3.774 | 26.30 | 0.760 | 0.202 | 0.038 | 19.0 |
| 20.0 | 8.0 | 2.500 | 29.00 | 0.690 | 0.276 | 0.034 | 19.0 |
| 20.0 | 12.0 | 1.667 | 33.00 | 0.606 | 0.364 | 0.030 | 19.0 |

TABLE 2

| volume units of solution | | | | | | microliter solution | | | | | |
|---|---|---|---|---|---|---|---|---|---|---|---|
| Ludox LS-30 | soln 1 | soln 2 | vann | sum | factor | ludox LS-30 | soln 1 | soln 2 | vann | sum | |
| 46.82415 | 221.8 | 8.8032 | 80.2 | 357.68 | 1.398 | 65.45573 | 310.122 | 12.306 | 112.117 | 500 | |
| 42.38186 | 200.8 | 44.782 | 67.85 | 355.81 | 1.405 | 59.55614 | 282.17 | 62.928 | 95.3453 | 500 | |
| 37.56574 | 178 | 83.788 | 54.46 | 353.79 | 1.413 | 53.08987 | 251.534 | 118.41 | 76.963 | 500 | |
| 33.05785 | 156.6 | 120.3 | 41.92 | 351.9 | 1.421 | 46.97017 | 222.539 | 170.92 | 59.566 | 500 | |
| 27.54821 | 130.5 | 164.92 | 26.6 | 349.59 | 1.43 | 39.40061 | 186.676 | 235.88 | 38.0473 | 500 | |
| 61.52206 | 194.3 | 7.5557 | 95.47 | 358.87 | 1.393 | 85.71586 | 270.741 | 10.527 | 133.016 | 500 | |
| 56.34861 | 178 | 39.551 | 83.24 | 357.12 | 1.4 | 78.89315 | 249.191 | 55.374 | 116.541 | 500 | R |
| 50.59875 | 159.8 | 75.11 | 69.64 | 355.17 | 1.408 | 71.23129 | 224.99 | 105.74 | 98.0404 | 500 | |
| 45.07889 | 142.4 | 109.25 | 56.59 | 353.3 | 1.415 | 63.79643 | 201.507 | 154.61 | 80.0876 | 500 | |
| 38.14367 | 120.5 | 152.14 | 40.19 | 350.95 | 1.425 | 54.34291 | 171.647 | 216.75 | 57.2603 | 500 | |
| 31.7864 | 100.4 | 191.45 | 25.16 | 348.8 | 1.433 | 45.56532 | 143.922 | 274.45 | 36.0653 | 500 | |
| 23.61275 | 74.58 | 242 | 5.832 | 346.03 | 1.445 | 34.11934 | 107.769 | 349.68 | 8.42692 | 500 | |
| 78.70917 | 162.1 | 6.0969 | 113.3 | 360.27 | 1.388 | 109.2369 | 225.022 | 8.4616 | 157.279 | 500 | |
| 73.10871 | 150.6 | 33.273 | 101.7 | 358.69 | 1.394 | 101.9118 | 209.933 | 46.382 | 141.773 | 500 | |
| 66.69566 | 137.4 | 64.393 | 88.4 | 356.87 | 1.401 | 93.4441 | 192.49 | 90.218 | 123.848 | 500 | |
| 60.3437 | 124.3 | 95.216 | 75.22 | 355.08 | 1.408 | 84.9719 | 175.038 | 134.08 | 105.913 | 500 | |
| 52.07744 | 107.3 | 135.33 | 58.06 | 352.75 | 1.417 | 73.81736 | 152.06 | 191.82 | 82.3009 | 500 | |
| 44.20527 | 91.06 | 173.53 | 41.73 | 350.52 | 1.426 | 63.05645 | 129.893 | 247.53 | 59.5215 | 500 | |
| 33.64295 | 69.3 | 224.78 | 19.81 | 347.54 | 1.439 | 48.40187 | 99.7054 | 323.39 | 28.4998 | 500 | |
| 86.83113 | 146.9 | 5.4075 | 121.8 | 360.93 | 1.385 | 120.2887 | 203.541 | 7.4911 | 168.68 | 500 | |
| 81.19472 | 137.4 | 30.245 | 110.6 | 359.44 | 1.391 | 112.9455 | 191.115 | 42.072 | 153.867 | 500 | |
| 74.64676 | 126.3 | 59.099 | 97.66 | 357.72 | 1.398 | 104.3381 | 176.551 | 82.606 | 136.505 | 500 | |
| 68.06028 | 115.2 | 88.123 | 84.63 | 355.98 | 1.405 | 95.59593 | 161.758 | 123.78 | 118.871 | 500 | |
| 59.3346 | 100.4 | 126.57 | 67.37 | 353.68 | 1.414 | 83.88217 | 141.937 | 178.94 | 95.2423 | 500 | |
| 50.85823 | 86.06 | 163.93 | 50.6 | 351.44 | 1.423 | 72.35622 | 122.434 | 233.22 | 71.9928 | 500 | |
| 39.22118 | 66.37 | 215.2 | 27.58 | 348.38 | 1.435 | 56.29159 | 95.2511 | 308.87 | 39.5881 | 500 | |
| 101.2492 | 119.9 | 4.1838 | 136.7 | 362.1 | 1.381 | 139.8085 | 165.599 | 5.7777 | 188.815 | 500 | |
| 95.81986 | 113.5 | 24.767 | 126.7 | 360.81 | 1.386 | 132.7847 | 157.28 | 34.322 | 175.614 | 500 | R |
| 89.34554 | 105.8 | 49.312 | 114.8 | 359.27 | 1.392 | 124.3431 | 147.281 | 68.629 | 159.748 | 500 | |
| 82.64463 | 97.89 | 74.717 | 102.4 | 357.68 | 1.398 | 115.5296 | 136.841 | 104.45 | 143.182 | 500 | |
| 73.46189 | 87.01 | 109.53 | 85.49 | 355.49 | 1.406 | 103.3234 | 122.384 | 154.05 | 120.24 | 500 | |
| 64.19 | 76.03 | 144.68 | 68.39 | 353.29 | 1.415 | 90.84579 | 107.604 | 204.76 | 96.788 | 500 | |
| 50.85823 | 60.24 | 195.22 | 43.8 | 350.12 | 1.428 | 72.62926 | 86.0273 | 278.79 | 62.5493 | 500 | |

TABLE 2-continued

| volume units of solution | | | | | | microliter solution | | | | | |
|---|---|---|---|---|---|---|---|---|---|---|---|
| Ludox LS-30 | soln 1 | soln 2 | vann | sum | factor | ludox LS-30 | soln 1 | soln 2 | vann | sum | |
| 38.89159 | 46.07 | 240.59 | 21.73 | 347.28 | 1.44 | 55.99491 | 66.3244 | 346.4 | 31.2843 | 500 | |
| 116.2644 | 91.81 | 2.9093 | 152.3 | 363.32 | 1.376 | 160.0031 | 126.346 | 4.0038 | 209.647 | 500 | |
| 111.431 | 87.99 | 18.92 | 143.9 | 362.27 | 1.38 | 153.7963 | 121.445 | 26.114 | 198.645 | 500 | |
| 105.5038 | 83.31 | 38.554 | 133.6 | 360.98 | 1.385 | 146.1356 | 115.396 | 53.402 | 185.067 | 500 | |
| 99.17355 | 78.31 | 59.523 | 122.6 | 359.6 | 1.39 R | 137.8934 | 108.887 | 82.762 | 170.457 | 500 | R |
| 90.15778 | 71.19 | 89.388 | 106.9 | 357.64 | 1.398 | 126.0449 | 99.531 | 124.97 | 149.456 | 500 | |
| 80.62891 | 63.67 | 120.95 | 90.32 | 355.57 | 1.406 | 113.38 | 89.5303 | 170.08 | 127.007 | 500 | |
| 66.1157 | 52.21 | 169.03 | 65.06 | 352.41 | 1.419 | 93.80433 | 74.0723 | 239.81 | 92.309 | 500 | |
| 52.19661 | 41.22 | 215.13 | 40.84 | 349.39 | 1.431 | 74.69769 | 58.9848 | 307.88 | 58.4422 | 500 | |
| 131.9148 | 62.5 | 1.581 | 168.6 | 364.59 | 1.371 | 180.9081 | 85.7122 | 2.1682 | 231.212 | 500 | |
| 128.1312 | 60.71 | 12.665 | 162.3 | 363.83 | 1.374 | 176.0871 | 83.428 | 17.406 | 223.079 | 500 | |
| 123.3502 | 58.44 | 26.672 | 154.4 | 362.87 | 1.378 | 169.9663 | 80.5281 | 36.751 | 212.754 | 500 | |
| 118.0638 | 55.94 | 42.159 | 145.6 | 361.8 | 1.382 | 163.1606 | 77.3036 | 58.262 | 201.274 | 500 | |
| 110.1928 | 52.21 | 65.217 | 132.6 | 360.22 | 1.388 | 152.9531 | 72.4674 | 90.525 | 184.055 | 500 | |
| 101.4045 | 48.04 | 90.964 | 118 | 358.45 | 1.395 | 141.4491 | 67.017 | 126.89 | 164.649 | 500 | |
| 86.99435 | 41.22 | 133.18 | 94.16 | 355.55 | 1.406 | 122.3386 | 57.9626 | 187.29 | 132.411 | 500 | |
| 71.86489 | 34.05 | 177.5 | 69.09 | 352.5 | 1.418 | 101.9356 | 48.2959 | 251.77 | 97.9937 | 500 | |
| 146.7281 | 34.76 | 0.3237 | 184 | 365.79 | 1.367 | 200.5611 | 47.5118 | 0.4424 | 251.485 | 5Oo | |
| 141.2729 | 33.47 | 14.739 | 175.3 | 364.76 | 1.371 | 193.6507 | 45.8747 | 20.203 | 240.271 | 500 | |
| 132.2314 | 31.32 | 38.63 | 160.9 | 363.05 | 1.377 | 182.1111 | 43.1411 | 53.201 | 221.546 | 500 | |
| 125.6953 | 29.78 | 55.901 | 150.4 | 361.81 | 1.382 | 173.7011 | 41.1488 | 77.25 | 207.9 | 500 | |
| 113.9926 | 27 | 86.824 | 131.8 | 359.6 | 1.39 R | 158.4988 | 37.5475 | 120.72 | 183.231 | 500 | R |
| 100.1753 | 23.73 | 123.33 | 109.7 | 356.99 | 1.401 | 140.3068 | 33.2379 | 172.74 | 153.712 | 500 | |

R = point reproduced

EXAMPLE 6

In another embodiment, premixed gels of aluminumphosphate, silicoaluminumphosphate and cobaltaluminumphosphate were prepared and administered by means of the "Tecan Miniprep™" to the one hundred cavities of the multiautoclave of example 3. Thereafter six different organic compounds were added according to the molar ratios specified in Table 3. The multi-autoclave was then closed and was heated for forty-eight hours in an oven at 200° C. The solid synthesis products were recovered as described in example 5 and were dried overnight at ambient temperatures. The products were characterized by X-ray diffraction using a Siemens D5000 diffractometer equipped with PSD detector and an automatic sample shifter. Several different crystalline phases were identified among the products including those of the structures AFI, ERI and CHA.

TABLE 3

| Position | Mols AlPO gel | Mols SAPO gel | Mols CoAPO gel | R1 | Mols R1 | R2 | Mols R2 |
|---|---|---|---|---|---|---|---|
| 1 | 1 | 0 | 0 | CYCLOHEXY | 1 | — | 0 |
| 2 | 1 | 0 | 0 | MORPHOLIN | 1 | — | 0 |
| 3 | 1 | 0 | 0 | TRIPROPYL | 1 | — | 0 |
| 4 | 1 | 0 | 0 | DI-N-PROP | 1 | — | 0 |
| 5 | 1 | 0 | 0 | TEAOH | 1 | — | 0 |
| 6 | 1 | 0 | 0 | TRIETHYLA | 1 | — | 0 |
| 7 | 0 | 1 | 0 | CYCLOHEXY | 1 | — | 0 |
| 8 | 0.25 | 0.75 | 0 | CYCLOHEXY | 1 | — | 0 |
| 9 | 0.5 | 0.5 | 0 | CYCLOHEXY | 1 | — | 0 |
| 10 | 0 | 1 | 0 | MORPHOLIN | 1 | — | 0 |
| 11 | 0.25 | 0.75 | 0 | MORPHOLIN | 1 | — | 0 |
| 12 | 0.5 | 0.5 | 0 | MORPHOLIN | 1 | — | 0 |
| 13 | 0 | 1 | 0 | TRIPROPYL | 1 | — | 0 |
| 14 | 0.25 | 0.75 | 0 | TRIPROPYL | 1 | — | 0 |
| 15 | 0.5 | 0.5 | 0 | TRIPROPYL | 1 | — | 0 |
| 16 | 0 | 1 | 0 | DI-N-PROP | 1 | — | 0 |
| 17 | 0.25 | 0.75 | 0 | DI-N-PROP | 1 | — | 0 |
| 18 | 0.5 | 0.5 | 0 | DI-N-PROP | 1 | — | 0 |
| 19 | 0 | 1 | 0 | TEAOH | 1 | — | 0 |
| 20 | 0.25 | 0.75 | 0 | TEAOH | 1 | — | 0 |
| 21 | 0.5 | 0.5 | 0 | TEAOH | 1 | — | 0 |
| 22 | 0 | 1 | 0 | TRIETHYLA | 1 | — | 0 |
| 23 | 0.25 | 0.75 | 0 | TRIETHYLA | 1 | — | 0 |
| 24 | 0.5 | 0.5 | 0 | TRIETHYLA | 1 | — | 0 |
| 25 | 0 | 0 | 1 | CYCLOHEXY | 1 | — | 0 |
| 26 | 0.25 | 0 | 0.75 | CYCLOHEXY | 1 | — | 0 |
| 27 | 0.5 | 0 | 0.5 | CYCLOHEXY | 1 | — | 0 |
| 28 | 0 | 0 | 1 | MORPHOLIN | 1 | — | 0 |
| 29 | 0.25 | 0 | 0.75 | MORPHOLIN | 1 | — | 0 |

TABLE 3-continued

| Position | Mols AlPO gel | Mols SAPO gel | Mols CoAPO gel | R1 | Mols R1 | R2 | Mols R2 |
|---|---|---|---|---|---|---|---|
| 30 | 0.5 | 0 | 0.5 | MORPHOLIN | 1 | — | 0 |
| 31 | 0 | 0 | 1 | TRIPROPYL | 1 | — | 0 |
| 32 | 0.25 | 0 | 0.75 | TRIPROPYL | 1 | — | 0 |
| 33 | 0.5 | 0 | 0.5 | TRIPROPYL | 1 | — | 0 |
| 34 | 0 | 0 | 1 | DI-N-PROP | 1 | — | 0 |
| 35 | 0.25 | 0 | 0.75 | DI-N-PROP | 1 | — | 0 |
| 36 | 0.5 | 0 | 0.5 | DI-N-PROP | 1 | — | 0 |
| 37 | 0 | 0 | 1 | TEAOH | 1 | — | 0 |
| 38 | 0.25 | 0 | 0.75 | TEAOH | 1 | — | 0 |
| 39 | 0.5 | 0 | 0.5 | TEAOH | 1 | — | 0 |
| 40 | 0 | 0 | 1 | TRIETHYLA | 1 | — | 0 |
| 41 | 0.25 | 0 | 0.75 | TRIETHYLA | 1 | — | 0 |
| 42 | 0.5 | 0 | 0.5 | TRIETHYLA | 1 | — | 0 |
| 43 | 0 | 0.25 | 0.75 | CYCLOHEXY | 1 | — | 0 |
| 44 | 0 | 0.5 | 0.5 | CYCLOHEXY | 1 | — | 0 |
| 45 | 0 | 0.75 | 0.25 | CYCLOHEXY | 1 | — | 0 |
| 46 | 0 | 0.25 | 0.75 | MORPHOLIN | 1 | — | 0 |
| 47 | 0 | 0.5 | 0.5 | MORPHOLIN | 1 | — | 0 |
| 48 | 0 | 0.75 | 0.25 | MORPHOLIN | 1 | — | 0 |
| 49 | 0 | 0.25 | 0.75 | TRIPROPYL | 1 | — | 0 |
| 50 | 0 | 0.5 | 0.5 | TRIPROPYL | 1 | — | 0 |
| 51 | 0 | 0.75 | 0.25 | TRIPROPYL | 1 | — | 0 |
| 52 | 0 | 0.25 | 0.75 | DI-N-PROP | 1 | — | 0 |
| 53 | 0 | 0.5 | 0.5 | DI-N-PROP | 1 | — | 0 |
| 54 | 0 | 0.75 | 0.25 | DI-N-PROP | 1 | — | 0 |
| 55 | 0 | 0.25 | 0.75 | TEAOH | 1 | — | 0 |
| 56 | 0 | 0.5 | 0.5 | TEAOH | 1 | — | 0 |
| 57 | 0 | 0.75 | 0.25 | TEAOH | 1 | — | 0 |
| 58 | 0 | 0.25 | 0.75 | TRIETHYLA | 1 | — | 0 |
| 59 | 0 | 0.5 | 0.5 | TRIETHYLA | 1 | — | 0 |
| 60 | 0 | 0.75 | 0.25 | TRIETHYLA | 1 | — | 0 |
| 61 | 0 | 0 | 1 | CYCLOHEXY | 0.25 | MORPHOLIN | 0.75 |
| 62 | 0 | 0 | 1 | CYCLOHEXY | 0.25 | TRIPROPYL | 0.75 |
| 63 | 0 | 0 | 1 | CYCLOHEXY | 0.25 | DI-N-PROP | 0.75 |
| 64 | 0 | 0 | 1 | CYCLOHEXY | 0.25 | TEAOH | 0.75 |
| 65 | 0 | 0 | 1 | CYCLOHEXY | 0.25 | TRIETHYLA | 0.75 |
| 66 | 0 | 0 | 1 | MORPHOLIN | 0.25 | TRIPROPYL | 0.75 |
| 67 | 0 | 0 | 1 | MORPHOLIN | 0.25 | DI-N-PROP | 0.75 |
| 68 | 0 | 0 | 1 | MORPHOLIN | 0.25 | TEAOH | 0.75 |
| 69 | 0 | 0 | 1 | MORPHOLIN | 0.25 | TRIETHYLA | 0.75 |
| 70 | 0 | 0 | 1 | TRIPROPYL | 0.25 | DI-N-PROP | 0.75 |
| 71 | 0 | 0 | 1 | TRIPROPYL | 0.25 | TEAOH | 0.75 |
| 72 | 0 | 0 | 1 | TRIPROPYL | 0.25 | TRIETHYLA | 0.75 |
| 73 | 0 | 0 | 1 | DI-N-PROP | 0.25 | TEAOH | 0.75 |
| 74 | 0 | 0 | 1 | DI-N-PROP | 0.25 | TRIETHYLA | 0.75 |
| 75 | 0 | 0 | 1 | TEAOH | 0.25 | TRIETHYLA | 0.75 |
| 76 | 0 | 0 | 1 | CYCLOHEXY | 0.75 | MORPHOLIN | 0.25 |
| 77 | 0 | 0 | 1 | CYCLOHEXY | 0.75 | TRIPROPYL | 0.25 |
| 78 | 0 | 0 | 1 | CYCLOHEXY | 0.75 | DI-N-PROP | 0.25 |
| 79 | 0 | 0 | 1 | CYCLOHEXY | 0.75 | TEAOH | 0.25 |
| 80 | 0 | 0 | 1 | CYCLOHEXY | 0.75 | TRIETHYLA | 0.25 |
| 81 | 0 | 0 | 1 | MORPHOLIN | 0.75 | TRIPROPYL | 0.25 |
| 82 | 0 | 0 | 1 | MORPHOLIN | 0.75 | DI-N-PROP | 0.25 |
| 83 | 0 | 0 | 1 | MORPHOLIN | 0.75 | TEAOH | 0.25 |
| 84 | 0 | 0 | 1 | MORPHOLIN | 0.75 | TRIETHYLA | 0.25 |
| 85 | 0 | 0 | 1 | TRIPROPYL | 0.75 | DI-N-PROP | 0.25 |
| 86 | 0 | 0 | 1 | TRIPROPYL | 0.75 | TEAOH | 0.25 |
| 87 | 0 | 0 | 1 | TRIPROPYL | 0.75 | TRIETHYLA | 0.25 |
| 88 | 0 | 0 | 1 | DI-N-PROP | 0.75 | TEAOH | 0.25 |
| 89 | 0 | 0 | 1 | DI-N-PROP | 0.75 | TRIETHYLA | 0.25 |
| 90 | 0 | 0 | 1 | TEAOH | 0.75 | TRIETHYLA | 0.25 |

91–100 Reproductions chosen at random from compositions 1–90

CYCLOHEX = Cyclohexylamine
MORPHOLI = morpholine
TRIPROPYL = tripropylamine
DI-N-PROP = dipropylamine
TEAOH = tetraethylammonium hydroxide
TRIETHYLA = triethylamine

What is claimed is:

1. A multi-autoclave comprising:
   a block defining plural openings that extend completely through said block, said plural openings being closed in a pressure tight manner at one end of said plural openings by a first closure member and said plural openings being open at another end of said plural openings;
   a second closure member to seal said plural openings in a pressure tight manner at said another end of said plural openings; and
   a locking device to force said second closure member against said block such that said second closure member seals said plural openings in a pressure tight manner at said another end of said plural openings so as not to be in fluid communication with one another, whereby the sealed plural openings define plural reaction chambers.

2. The multi-autoclave according to claim 1, wherein said second closure member comprises a cover member and a seal member, with said seal member being constructed and arranged to be positioned between said cover member and said block such that said locking device is to force said second closure member against said block by applying a force against said cover member such that said seal member is forced against said block.

3. The multi-autoclave according to claim 2,
   wherein said locking device comprises plural fasteners passing through holes extending through said cover member, through said block and through said first closure member.

4. The multi-autoclave according to claim 2, wherein said seal member comprises a compressible or deformable material.

5. The multi-autoclave according to claim 2, wherein said block comprises a compressible or deformable material.

6. The multi-autoclave according to claim 2, wherein said seal member is fixed to said cover member.

7. The multi-autoclave according to claim 6, wherein said seal member comprises a polymer film sized so as to cover all of said plural openings.

8. The multi-autoclave according to claim 2, wherein said seal member comprises plural spherically-shaped bodies fixed to said cover member and facing said another end of said plural openings.

9. The multi-autoclave according to claim 2, wherein said seal member comprises plural spherically-shaped bodies that are not fixed to said cover member and face said another end of said plural openings.

10. The multi-autoclave according to claim 2, wherein said seal member comprises plural circular disk-shaped bodies that are fixed to said cover member.

11. The multi-autoclave according to claim 2, wherein said seal member comprises plural circular disk-shaped bodies that are not fixed to said cover member.

12. The multi-autoclave according to claim 2, wherein said seal member comprises a membrane that covers said plural openings and is fixed to said cover member.

13. The multi-autoclave according to claim 2, wherein said seal member comprises a membrane that covers said plural openings and is not fixed to said cover member.

14. The multi-autoclave according to claim 2, wherein a single said second closure member is provided.

15. The multi-autoclave according to claim 2, wherein said cover member comprises a rigid plate.

16. The multi-autoclave according to claim 2, wherein said plural openings each have a width-wise dimension, and said block includes plural protruding profiles each with a width-wise dimension that is greater than a corresponding width-wise dimension of said plural openings, with said plural protruding profiles each being of a cross-sectional shape such that when said locking device applies the force against said cover member said seal member is forced against said plural protruding profiles such that a pressure tight seal is formed over and around each of said plural openings.

17. The multi-autoclave according to claim 2, wherein said seal member comprises a polymer film sized so as to cover all of said plural openings.

18. The multi-autoclave according to claim 1, wherein said second closure member includes plural spherically-shaped protrusions facing said another end of said plural openings.

19. The multi-autoclave according to claim 1, wherein said plural openings each have a width-wise dimension, and said second closure member includes plural protrusions each with a width-wise dimension that is greater than a corresponding width-wise dimension of said plural openings, with said plural protrusions each being of a cross-sectional shape such that when said locking device forces said second closure member against said block a pressure tight seal is formed over and around each of said plural openings.

20. The multi-autoclave according to claim 1, wherein
   said locking device includes threaded fasteners passing through said second closure member and into said block,
   said second closure member comprises a cover member and a seal member, with said seal member being constructed and arranged to be positioned between said cover member and said block such that said threaded fasteners are to force said second closure member against said block by applying a force against said cover member such that said seal member is forced against said block.

21. The multi-autoclave according to claim 20,
   wherein said threaded fasteners pass through holes extending through said cover member, through said block and through said first closure member.

22. The multi-autoclave according to claim 20, wherein said seal member comprises a compressible or deformable material.

23. The multi-autoclave according to claim 20, wherein said seal member is fixed to said cover member.

24. The multi-autoclave according to claim 23, wherein said seal member comprises a polymer film sized so as to cover all of said plural openings.

25. The multi-autoclave according to claim 20, wherein said seal member comprises plural circular disk-shaped bodies that are fixed to said cover member.

26. The multi-autoclave according to claim 20, wherein said seal member comprises plural circular disk-shaped bodies that are not fixed to said cover member.

27. The multi-autoclave according to claim 20, wherein said seal member comprises a membrane that covers said plural openings and is fixed to said cover member.

28. The multi-autoclave according to claim 20, wherein said seal member comprises a membrane that covers said plural openings and is not fixed to said cover member.

29. The multi-autoclave according to claim 20, wherein a single said second closure member is provided.

30. The multi-autoclave according to claim 20, wherein said cover member comprises a rigid plate.

31. The multi-autoclave according to claim 20, wherein said plural openings each have a width-wise dimension, and said block includes plural protruding profiles each with a width-wise dimension that is greater than a corresponding width-wise dimension of said plural openings, with said plural protruding profiles each being of a cross-sectional shape such that when said locking device applies the force against said cover member said seal member is forced against said plural protruding profiles such that a pressure tight seal is formed over and around each of said plural openings.

32. The multi-autoclave according to claim 20, wherein said seal member comprises a polymer film sized so as to cover all of said plural openings.

33. The multi-autoclave according to claim 20, wherein said block comprises a compressible or deformable material.

34. The multi-autoclave according to claim 1, wherein
said locking device comprises a rigid frame enclosing said block,
said second closure member comprises a cover member and a seal member, with said seal member being constructed and arranged to be positioned between said cover member and said block.

35. The multi-autoclave according to claim 34, wherein said seal member comprises a compressible or deformable material.

36. The multi-autoclave according to claim 34, wherein said seal member is fixed to said cover member.

37. The multi-autoclave according to claim 36, wherein said seal member comprises a polymer film sized so as to cover all of said plural openings.

38. The multi-autoclave according to claim 34, wherein said seal member comprises plural circular disk-shaped bodies that are fixed to said cover member.

39. The multi-autoclave according to claim 34, wherein said seal member comprises plural circular disk-shaped bodies that are not fixed to said cover member.

40. The multi-autoclave according to claim 34, wherein said seal member comprises a membrane that covers said plural openings and is fixed to said cover member.

41. The multi-autoclave according to claim 34, wherein said seal member comprises a membrane that covers said plural openings and is not fixed to said cover member.

42. The multi-autoclave according to claim 34, wherein a single said second closure member is provided.

43. The multi-autoclave according to claim 34, wherein said cover member comprises a rigid plate.

44. The multi-autoclave according to claim 2, wherein said plural openings each have a width-wise dimension, and said block includes plural protruding profiles each with a width-wise dimension that is greater than a corresponding width-wise dimension of said plural openings, with said plural protruding profiles each being of a cross-sectional shape such that when said locking device applies the force against said cover member said seal member is forced against said plural protruding profiles such that a pressure tight seal is formed over and around each of said plural openings.

45. The multi-autoclave according to claim 34, wherein said seal member comprises a polymer film sized so as to cover all of said plural openings.

46. The multi-autoclave according to claim 34, wherein said rigid frame also encloses said second closure member.

47. The multi-autoclave according to claim 34, wherein said block comprises a compressible or deformable material.

48. The multi-autoclave according to claim 1, further comprising a frame surrounding said block so as to prevent lateral deformation of said block and ensure that outer ones of said plural openings remain sealed in the pressure tight manner,
wherein said second closure member comprises a cover member and a seal member, with said seal member being constructed and arranged to be positioned between said cover member and said block such that said locking device is to force said second closure member against said block by applying a force against said cover member such that said seal member is forced against said block.

49. The multi-autoclave according to claim 48, wherein said seal member comprises a compressible or deformable material.

50. The multi-autoclave according to claim 48, wherein said seal member is fixed to said cover member.

51. The multi-autoclave according to claim 50, wherein said seal member comprises a polymer film sized so as to cover all of said plural openings.

52. The multi-autoclave according to claim 48, wherein said seal member comprises plural circular disk-shaped bodies that are fixed to said cover member.

53. The multi-autoclave according to claim 48, wherein said seal member comprises plural circular disk-shaped bodies that are not fixed to said cover member.

54. The multi-autoclave according to claim 48, wherein said seal member comprises a membrane that covers said plural openings and is fixed to said cover member.

55. The multi-autoclave according to claim 48, wherein said seal member comprises a membrane that covers said plural openings and is not fixed to said cover member.

56. The multi-autoclave according to claim 48, wherein a single said second closure member is provided.

57. The multi-autoclave according to claim 48, wherein said cover member comprises a rigid plate.

58. The multi-autoclave according to claim 48, wherein said plural openings each have a width-wise dimension, and said block includes plural protruding profiles each with a width-wise dimension that is greater than a corresponding width-wise dimension of said plural openings, with said plural protruding profiles each being of a cross-sectional shape such that when said locking device applies the force against said cover member said seal member is forced against said plural protruding profiles such that a pressure tight seal is formed over and around each of said plural openings.

59. The multi-autoclave according to claim 48, wherein said seal member comprises a polymer film sized so as to cover all of said plural openings.

60. The multi-autoclave according to claim 48, wherein said block comprises a compressible or deformable material.

61. The multi-autoclave according to claim 1, further comprising a frame surrounding said block so as to prevent lateral deformation of said block and ensure that outer ones of said plural openings remain sealed in the pressure tight manner,
wherein said locking device includes threaded fasteners passing through said second closure member and into said block, and
wherein said second closure member comprises a cover member and a seal member, with said seal member being constructed and arranged to be positioned between said cover member and said block such that said threaded fasteners are to force said second closure member against said block by applying a force against said cover member such that said seal member is forced against said block.

62. The multi-autoclave according to claim 61,
wherein said threaded fasteners pass through holes extending through said cover member, through said block and through said first closure member.

63. The multi-autoclave according to claim 61, wherein said block comprises a compressible or deformable material.

64. The multi-autoclave according to claim 1, wherein said plural openings comprise perforations that extend completely through said block.

65. The multi-autoclave according to claim 1,
wherein said locking device comprises plural fasteners passing through holes extending through said cover member, through said block and through said first closure member.

66. The multi-autoclave according to claim 1, wherein said second closure member comprises a compressible or deformable material.

67. The multi-autoclave according to claim 1, wherein said block comprises a compressible or deformable material.

68. The multi-autoclave according to claim 1, wherein said second closure member comprises plural circular disk-shaped bodies.

69. The multi-autoclave according to claim 1, wherein said second closure member comprises a membrane that covers said plural openings.

70. The multi-autoclave according to claim 1, wherein a single said second closure member is provided.

71. The multi-autoclave according to claim 1, wherein said second closure member comprises a rigid plate.

72. The multi-autoclave according to claim 1, wherein
said locking device includes fasteners passing through said second closure member and into said block at positions that are located between at least some of said plural openings,
said second closure member comprises a cover member and a seal member, with said seal member being constructed and arranged to be positioned between said cover member and said block such that said fasteners are to force said second closure member against said block by applying a force against said cover member such that said seal member is forced against said block.

73. The multi-autoclave according to claim 72,
wherein said fasteners pass through holes extending through said cover member, through said block and through said first closure member.

74. The multi-autoclave according to claim 72, wherein said seal member comprises a compressible or deformable material.

75. The multi-autoclave according to claim 72, wherein said seal member is fixed to said cover member.

76. The multi-autoclave according to claim 75, wherein said seal member comprises a polymer film sized so as to cover all of said plural openings.

77. The multi-autoclave according to claim 72, wherein said seal member comprises plural spherically-shaped bodies fixed to said cover member and facing said another end of said plural openings.

78. The multi-autoclave according to claim 72, wherein said seal member comprises plural spherically-shaped bodies that are not fixed to said cover member and face said another end of said plural openings.

79. The multi-autoclave according to claim 72, wherein said seal member comprises plural circular disk-shaped bodies that are fixed to said cover member.

80. The multi-autoclave according to claim 72, wherein said seal member comprises plural circular disk-shaped bodies that are not fixed to said cover member.

81. The multi-autoclave according to claim 72, wherein said seal member comprises a membrane that covers said plural openings and is fixed to said cover member.

82. The multi-autoclave according to claim 72, wherein said seal member comprises a membrane that covers said plural openings and is not fixed to said cover member.

83. The multi-autoclave according to claim 72, wherein a single said second closure member is provided.

84. The multi-autoclave according to claim 72, wherein said cover member comprises a rigid plate.

85. The multi-autoclave according to claim 72, wherein said plural openings each have a width-wise dimension, and said block includes plural protruding profiles each with a width-wise dimension that is greater than a corresponding width-wise dimension of said plural openings, with said plural protruding profiles each being of a cross-sectional shape such that when said locking device applies the force against said cover member said seal member is forced against said plural protruding profiles such that a pressure tight seal is formed over and around each of said plural openings.

86. The multi-autoclave according to claim 72, wherein said seal member comprises a polymer film sized so as to cover all of said plural openings.

87. A multi-autoclave comprising:
a block defining plural openings that are closed at one end of said plural openings and are open at another end of said plural openings;
a closure member to seal said plural openings in a pressure tight manner at said another end of said plural openings; and
a locking device to force said second closure member against said block such that said second closure member seals said plural openings in a pressure tight manner at said another end of said plural openings so as not to be in fluid communication with one another, whereby the sealed plural openings define plural reaction chambers,
wherein said locking device includes threaded fasteners passing through said second closure member and into said block, and
wherein said closure member comprises plural spherically-shaped bodies facing said another end of said plural openings.

88. A multi-autoclave comprising:
a block defining plural openings that are closed at one end of said plural openings and are open at another end of said plural openings;
a closure member to seal said plural openings in a pressure tight manner at said another end of said plural openings; and
a locking device to force said second closure member against said block such that said second closure member seals said plural openings in a pressure tight manner at said another end of said plural openings so as not to be in fluid communication with one another, whereby the sealed plural openings define plural reaction chambers,
wherein said locking device comprises a rigid frame enclosing said block, and
wherein said closure member comprises plural spherically-shaped bodies facing said another end of said plural openings.

89. A multi-autoclave comprising:
a block defining plural openings that are closed at one end of said plural openings and are open at another end of said plural openings,
a closure member to seal said plural openings in a pressure tight manner at said another end of said plural openings:
a locking device to force said second closure member against said block such that said second closure member seals said plural openings in a pressure tight manner at said another end of said plural openings so as not to be in fluid communication with one another, whereby the sealed plural openings define plural reaction chambers; and
a frame surrounding said block so as to prevent lateral deformation of said block and ensure that outer ones of said plural openings remain sealed in the pressure tight manner,
wherein said seal member comprises plural spherically-shaped bodies facing said another end of said plural openings.

* * * * *